US012700428B2

(12) United States Patent     (10) Patent No.:   US 12,700,428 B2

Musunuri et al.       (45) Date of Patent:     Aug. 4, 2026

(54) TRIM PASS METADATA PREDICTION IN VIDEO SEQUENCES USING NEURAL NETWORKS

(71) Applicant: DOLBY LABORATORIES LICENSING CORPORATION

(72) Inventors: Sri Harsha Musunuri, Santa Clara, CA (US); Shruthi Suresh Rotti, Mountain House, CA (US); Anustup Kumar Atanu Choudhury, Campbell, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 26 days.

(21) Appl. No.: 18/865,266

(22) PCT Filed: May 15, 2023

(86) PCT No.: PCT/US2023/022250
§ 371 (c)(1),
(2) Date: Nov. 12, 2024

(87) PCT Pub. No.: WO2023/224917
PCT Pub. Date: Nov. 23, 2023

(65) Prior Publication Data
US 2025/0316291 A1     Oct. 9, 2025

Related U.S. Application Data

(60) Provisional application No. 63/342,306, filed on May 16, 2022.

(30) Foreign Application Priority Data

Jul. 1, 2022    (EP) ..................................... 22182506

(51) Int. Cl.
*G11B 27/031*     (2006.01)
*G06V 10/42*     (2022.01)
(Continued)

(52) U.S. Cl.
CPC ............ *G11B 27/031* (2013.01); *G06V 10/42* (2022.01); *G06V 10/7715* (2022.01);
(Continued)

(58) Field of Classification Search
None
See application file for complete search history.

(56) References Cited

U.S. PATENT DOCUMENTS 8,593,480 B1   11/2013   Ballestad
9,098,906 B2    8/2015   Bruls
(Continued)

FOREIGN PATENT DOCUMENTS

JP     2020017079 A    1/2020
JP     2020119462 A    8/2020
(Continued)

OTHER PUBLICATIONS

A Color-Volume Mapping System for Perception-Accurate Reproduction of HDR Imagery in SDR production workflows. Pascal Kutschbach. SMPTE 2020 Annual Technical Conference and Exhibition, Date of Conference: Nov. 10-12, 2020, DOI: 10.5594/M001921. 17 pages.
(Continued)

*Primary Examiner* — Gelek W Topgyal

(57) ABSTRACT

Methods and systems for generating trim-pass metadata for high dynamic range (HDR) video are described. The trim-pass prediction pipeline includes a feature extraction network followed by a fully connected network which maps extracted features to trim-pass values. In a first architecture, the feature extraction network is based on four cascaded
(Continued)

convolutional networks. In a second architecture, the feature extraction network is based on a modified MobileNetV3 neural network. In both architectures, the fully connected network is formed by a set of three linear networks, each set customized to best match its corresponding feature extraction network.

10 Claims, 3 Drawing Sheets

(51) Int. Cl.
| | |
|---|---|
| *G06V 10/77* | (2022.01) |
| *G06V 10/774* | (2022.01) |
| *G06V 10/82* | (2022.01) |
| *G11B 27/34* | (2006.01) |

(52) U.S. Cl.
CPC ............ *G06V 10/774* (2022.01); *G06V 10/82* (2022.01); *G11B 27/34* (2013.01)

(56) References Cited

U.S. PATENT DOCUMENTS

| | | | | |
|---|---|---|---|---|
| 9,715,642 | B2 * | 7/2017 | Szegedy | ................ G06N 3/084 |
| 9,819,974 | B2 | 11/2017 | Kunkel | |
| 10,244,244 | B2 | 3/2019 | Piramanayagam | |
| 10,264,287 | B2 * | 4/2019 | Wen | .................... H04N 19/186 |
| 10,600,166 | B2 | 3/2020 | Pytlarz | |
| 11,158,286 | B2 | 10/2021 | Yaacob | |
| 11,310,509 | B2 | 4/2022 | Topiwala | |
| 11,361,506 | B2 | 6/2022 | Su | |
| 2019/0080440 | A1 | 3/2019 | Eriksson | |
| 2021/0076042 | A1 * | 3/2021 | Choudhury | .............. H04N 9/69 |
| 2021/0142068 | A1 * | 5/2021 | Aliamiri | .............. G06V 10/774 |
| 2021/0150812 | A1 * | 5/2021 | Su | ........................ G06N 3/0499 |
| 2021/0350512 | A1 * | 11/2021 | Kadu | .................... A63F 13/355 |
| 2021/0400286 | A1 | 12/2021 | Kale | |
| 2022/0078386 | A1 | 3/2022 | Zink | |
| 2022/0084170 | A1 | 3/2022 | Aydin | |

FOREIGN PATENT DOCUMENTS

| | | |
|---|---|---|
| JP | 2020533841 A | 11/2020 |
| JP | 2021135619 A | 9/2021 |
| JP | 2022524651 A | 5/2022 |
| WO | 2021030506 A1 | 2/2021 |

OTHER PUBLICATIONS

A. Howard et al., "Searching for MobileNetV3," 2019 IEEE/CVF International Conference on Computer Vision (ICCV), Seoul, Korea (South), Nov. 20, 2019., pp. 1314-1324, 11 Pages.

Batch normalization: accelerating deep network training by reducing internal covariate shift, In Proceedings of the 32nd International Conference on International Conference on Machine Learning—vol. 37 (ICML'15). JMLR.org, pp. 448-456, 11 Pages.

Dolby Professional Support Learning. (2022). Module 2.8—The Dolby Vision Metadata Trim Pass. Retrieved from https://learning.dolby.com/hc/en-us/articles/360056574431-Module-2-8-The-Dolby-Vision-Metadata-Trim-Pass. 9 pages.

International Telecommunication Union. (2020). High dynamic range television for production and international programme exchange (Report ITU-R BT.2390-8). Geneva, Switzerland: ITU. 59 Pages.

J. Hu, L. Shen and G. Sun, "Squeeze-and-Excitation Networks," 2018 IEEE/CVF Conference on Computer Vision and Pattern Recognition, Salt Lake City, UT, USA, 2018, pp. 7132-7141, doi: 10.1109/CVPR.2018.00745.

* cited by examiner

TRIM PASS METADATA PREDICTION IN VIDEO SEQUENCES USING NEURAL NETWORKS

CROSS-REFERENCE TO RELATED APPLICATIONS

This application is a U.S. National Stage application under U.S.C. 371 of International Application No. PCT/US2023/022250, filed on May 15, 2023, which claims the benefit of priority from U.S. Provisional Patent Application Ser. No. 63/342,306, filed on May 16, 2022, and European Patent Application No. 22 182 506.0, filed on Jul. 1, 2022, each of which is incorporated by reference in its entirety.

TECHNOLOGY

The present invention relates generally to images. More particularly, an embodiment of the present invention relates to techniques for predicting trim pass metadata in video sequences using neural networks.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g., interchangeably.

As used herein, the term high dynamic range (HDR) relates to a DR breadth that spans some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image.

In practice, images comprise one or more color components (e.g., luma Y and chroma Cb and Cr) wherein each color component is represented by a precision of n-bits per pixel (e.g., n=8). For example, using gamma luminance coding, images where $n \leq 8$ (e.g., color 24-bit JPEG images) are considered images of standard dynamic range, while images where $n \geq 10$ may be considered images of enhanced dynamic range. EDR and HDR images may also be stored and distributed using high-precision (e.g., 16-bit) floating-point formats, such as the OpenEXR file format developed by Industrial Light and Magic.

Most consumer desktop displays currently support luminance of 200 to 300 cd/m$^2$ or nits. Most consumer HDTVs range from 300 to 500 nits with new models reaching 1000 nits (cd/m$^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). In general, without limitation, the methods of the present disclosure relate to any dynamic range higher than SDR.

As used herein, the term "display management" refers to processes that are performed on a receiver to render a picture for a target display. For example, and without limitation, such processes may include tone-mapping, gamut-mapping, color management, frame-rate conversion, and the like.

As used herein, the term "trim-pass" refers to a video post-production process where a colorist or a creative in charge of the content goes through a master grade of the content, shot by shot, and adjusts the lift-gamma-gain primaries and/or other color parameters to create a desired color or effect. Parameters related to this process (say, lift, gain, and gamma values) may also be embedded as trim-pass metadata or "trims" within the video content to be used later on as part of the display management process.

The creation and playback of high dynamic range (HDR) content is now becoming widespread as HDR technology offers more realistic and lifelike images than earlier formats. However, the broadcast infrastructure may not support the generation and transmission of custom trims when converting HDR content into SDR content for legacy displays. To improve existing coding schemes, as appreciated by the inventors here, improved techniques for automatically generating trim-pass metadata are developed.

US 2021/076042 A1 discloses a method for generating metadata for use by a video decoder for displaying video content encoded by a video encoder that includes accessing a target tone mapping curve; accessing a decoder tone curve corresponding to a tone curve used by the video decoder for tone mapping the video content; generating a plurality of parameters of a trim-pass function used by the video decoder to apply after applying the decoder tone curve to the video content, wherein the parameters of the trim-pass function are generated to approximate the target tone curve with the combination of the trim-pass function and the decoder tone curve, and generating the metadata for use by the video decoder, including said plurality of parameters of the trim-pass function.

US 2021/350512 A1 discloses a method of automatic display management generation for gaming or SDR+ contents. Different candidate image data feature types are evaluated to identify one or more specific image data feature types to be used in training a prediction model for optimizing one or more image metadata parameters. A plurality of image data features of the one or more selected image data feature types is extracted from one or more images. The plurality of image data features of the one or more selected image data feature types is reduced into a plurality of significant image data features. A total number of image data features in the plurality of significant image data features is no larger than a total number of image data features in the plurality of image data features of the one or more selected image data feature types. The plurality of significant image data features is applied to training the prediction model for optimizing one or more image metadata parameters.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY

The invention is defined by the independent claims. The dependent claims concern optional features of some embodiments of the invention.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1A:
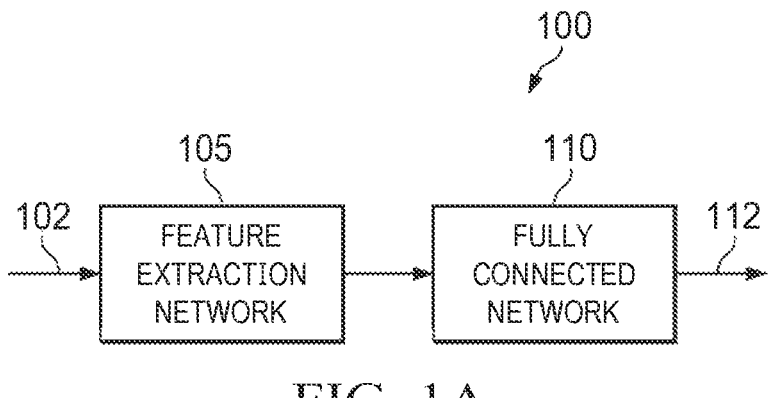
FIG. 1A depicts an example process for predicting trim-pass metadata for HDR video according to an example embodiment of the present invention.

Methods for trim-pass metadata prediction for video are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Summary

Example embodiments described herein relate to methods for generating trim-pass metadata for video sequences. In an embodiment, a processor receives a picture in a video sequence. A feature extraction neural network extracts image features from the picture and then passes them to a fully connected neural network which maps the image features to output trim-pass metadata values for the input picture.

Trim-Pass Metadata Prediction Pipeline

In traditional display mapping (DM), the mapping algorithm applies a sigmoid like function (for examples, see Refs [1-2]) to map the input dynamic range to the dynamic range of the target display. Such mapping functions may be represented as piece-wise linear or non-linear polynomials characterized by anchor points, pivots, and other polynomial parameters generated using characteristics of the input source and the target display. For example, in Refs. [1-2] the mapping functions use anchor points based on luminance characteristics (e.g., the minimum, medium (average), and maximum luminance) of the input images and the display. However, other mapping functions may use different statistical data, such as luminance-variance or luminance-standard deviation values at a block level or for the whole image. For SDR images, the process may also be assisted by additional metadata which are either transmitted as part of the transmitted video or they are computed by the decoder or the display. For example, when the content provider has both SDR and HDR versions of the source content, a source may use both versions to generate metadata (such as piece-wise linear approximations of forward or backward reshaping functions) to assist the decoder in converting incoming SDR images to HDR images.

As used herein, the term "L1 metadata" denotes minimum, medium, and maximum luminance values related to an input frame or image. L1 metadata may be computed by converting RGB data to a luma-chroma format (e.g., YCbCr) and then computing min, mid (average), and max values in the Y plane, or they can be computed directly in the RGB space. For example, in an embodiment, L1Min denotes the minimum of the PQ-encoded min (RGB) values of the image, while taking into consideration an active area (e.g., by excluding gray or black bars, letterbox bars, and the like). min (RGB) denotes the minimum of color component values {R, G, B} of a pixel. The values of L1Mid and L1Max may also be computed in a same fashion replacing the min ( ) function with the average ( ) and max ( ) functions. For example, L1Mid denotes the average of the PQ-encoded max (RGB) values of the image, and L1Max denotes the maximum of the PQ-encoded max (RGB) values of the image. In some embodiments, L1 metadata may be normalized to be in [0, 1].

Considering the L1Min, L1Mid, and L1Max values of the original HDR metadata, as well as the maximum (peak) and minimum (black) luminance of the target display, denoted as Tmax and Tmin. Then, as described in Ref. [1-2], one may generate an intensity tone-mapping mapping curve mapping the intensity of the input image to the dynamic range of the target display. This may be considered to be the ideal, single-stage, tone-mapping curve, to be matched by using the reconstructed metadata.

As noted earlier, the term "trims" denotes tone-curve adjustments performed by a colorist to improve tone mapping operations. Trims are typically applied to the SDR range (e.g., 100 nits maximum luminance, 0.005 nits minimum luminance). These values are then interpolated linearly to the target luminance range depending only on the maximum luminance. These values modify the default tone curve and are present for every trim.

Information about the trims may be part of the HDR metadata and may be used to adjust the original tone-mapping curves (see Ref. [1-3]). For example, in Dolby Vision, trims may be passed as Level 2 (L2) or Level 8 (L8) metadata that includes Slope, Offset, and Power variables (collectively referred to as SOP parameters) representing Gain and Gamma values to adjust pixel values. For example, if Slope, Offset, and Power are in [−0.5, 0.5], then, given Lift, Gain and Gamma:

$$\text{Slope} = \max\left(-0.5, \min\left(0.5, \text{Gain} * (1 - \text{Lift}) - 1\right)\right) \qquad (1)$$

$$\text{Offset} = \max\left(-0.5, \min\left(0.5, \text{Gain} * \text{Lift}\right)\right)$$

$$\text{Power} = \max\left(-0.5, \min\left(0.5, 1/\text{Gamma} - 1\right)\right)$$

In certain content creation scenarios, it may not be possible to employ a full range of color grading tools to derive SDR content from HDR content. Embodiments described herein propose using a neural network-based architecture to automatically generate such trim-pass metadata. The trim-pass metadata are configured to perform adjustments of a tone-mapping curve that is applied to an input picture when being displayed on a target display. While examples presented herein describe mostly how to predict Slope, Offset, and Power values, similar architectures can be applied to predict directly Lift, Gain, or Gamma, or other trims as those described in Ref. [3].

FIG. 1A depicts an example trim-prediction pipeline (100) for HDR images (102) according to an embodiment. As depicted in FIG. 1A, pipeline 100 includes the following modules or components:

HDR input (102)
  a neural network for feature extraction (105)
  a fully-connected neural network to map the extracted features to trim-pass metadata (110)
  trim-pass metadata output (112) (e.g., predicted SOP data)

The network (100) takes a given frame (102) as input and passes it to a convolutional neural network (105) for feature extraction that identifies the high-level features of the image, which are then passed to a fully connected network (110) that provides the mapping between the features and the trim metadata (112). Each of the high-level features corresponds to an image feature type of a set of image feature types. Each image feature type is represented by a plurality of associated image features extracted from a corresponding set of training images and used for training the convolutional neural network (105) for feature extraction. This network can be used as a stand-alone component, or it can be integrated in a video processing pipeline. For maintaining temporal consistency of the trim pass metadata, the network can also take multiple frames as input.

In an embodiment, the pipeline is formed out of neural-network (NN) blocks trained to work with HDR images coded using perceptual quantization (PQ) in the ICtCp color space as defined in Rec. BT. 2390, *"High dynamic range television for production and international programme exchange."* The ICtCp space is preferred due to being a perceptually uniform color space, thus improving spatio-temporal consistency.

Figure 1B:
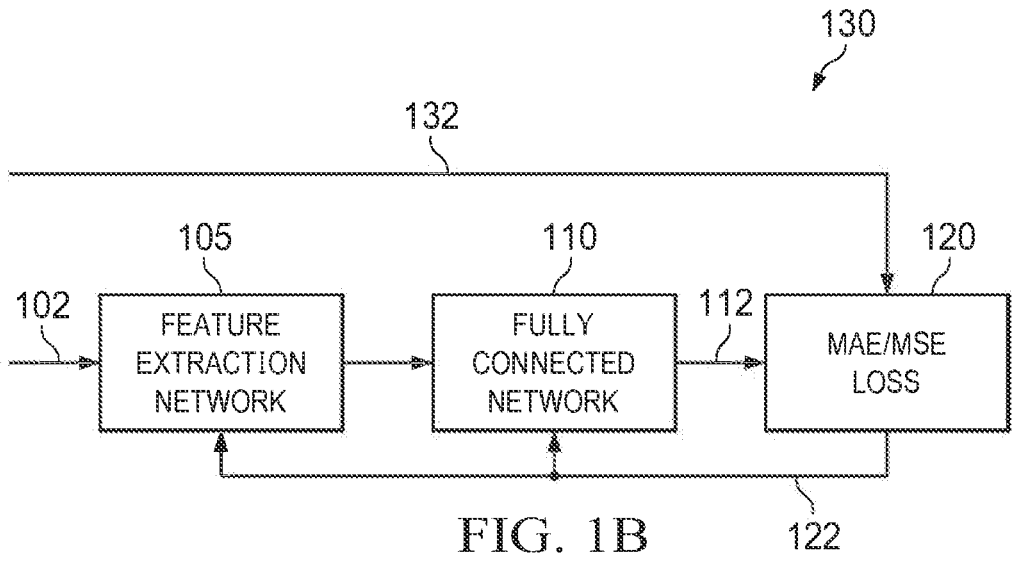
FIG. 1B depicts an example process for training the neural networks depicted in FIG. 1A.

FIG. 1B depict an example pipeline (130) to train network 100. Compared to the system (100), this system also includes:

Training input of true trim-pass metadata (132)
  An error/loss computation module (120), which computes an error function (say, mean square error (MSE) or mean absolute error (MAE)) between the training data (132) and the predicted values (112)
  A back propagation path (122) to train networks 105 and 110.

Trim-Pass Prediction Architectures

Figure 2:
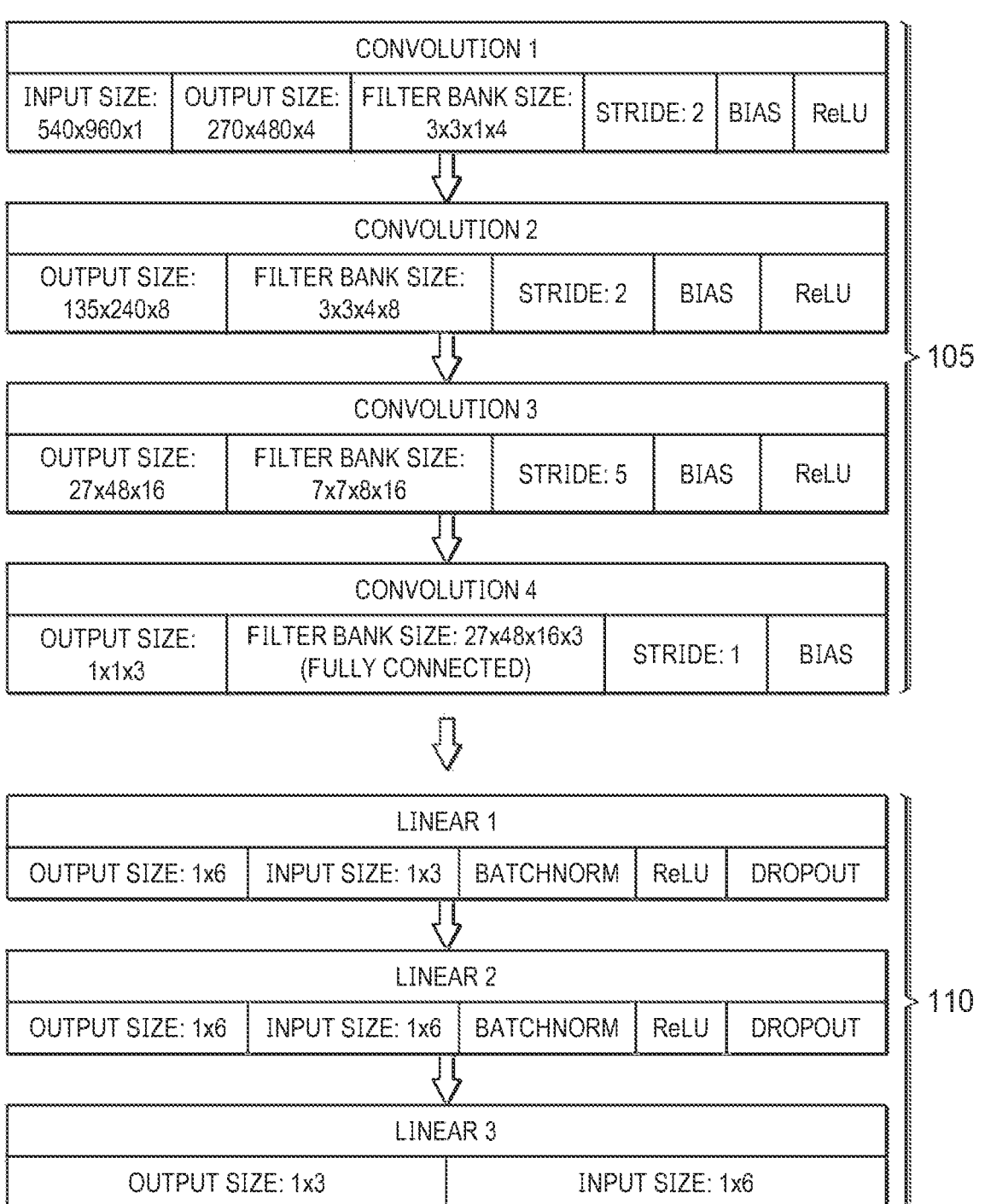
FIG. 2 depicts a first example of a neural-network architecture for generating trim-pass metadata according to an example embodiment of the present invention.

Two different trim-pass prediction architectures (100) have been designed. They provide a balance between accuracy and speed. FIG. 2 depicts the first architecture according to an embodiment.

In an embodiment, a neural network may be defined as a set of 4-dimensional convolutions, each of which is followed by adding a constant bias value to all results. In some layers, the convolution is followed by clamping negative values to 0. The convolutions are defined by their size in pixels (M×N), how many image channels (C) they operate on, and how many such kernels are in the filter bank (K). In that sense, each convolution can be described by the size of the filter bank M×N×C×K. As an example, a filter bank of the size 3×3×1×2 is composed of 2 convolution kernels, each of which operates on one channel, and has a size of 3 pixels by 3 pixels. Input and Output sizes are denoted as Height×Width×Channels.

Some filter banks may also have a stride, meaning that some results of the convolution are discarded. A stride of 1 means every input pixel produces an output pixel. A stride of 2 means that only every second pixel in each dimension produces an output, and the like. Thus, a filter bank with a stride of 2 will produce an output with (M/2)×(N/2) pixels, where M×N is the input image size. If padding=1, all inputs except the ones to fully connected kernels are padded so that setting the stride of 1 would produce an output with the same number of pixels as the input. The output of each convolution bank feeds as an input into the next convolution layer.

As depicted in FIG. 2, in the first architecture, the feature extraction network (105) includes four convolutional networks configured as:

CONV1: Input 540×960×1, 3×3×1×4, stride=2, output: 270×480×4, bias, rectified linear unit (ReLU) activation.
  CONV2: 3×3×4×8, stride=2, bias, activation ReLU, output: 135×240×8
  CONV3: 7×7×8×16, stride=5, bias, activation ReLU, output: 27×48×16
  CONV4: 27×48×16×3 (fully connected), stride=1, bias, output: 1×1×3

Following the feature extraction network, the fully connected network (110) includes three linear networks configured as follows:

Linear1: Input: 1×3, Output 1×6, Batch Norm, ReLU, DropOut
  Linear2: Input: 1×6, Output 1×6, Batch Norm, ReLU, DropOut.
  Linear 3: Input: 1×6, Output 1×3

DropOut refers to using Dropout regularization, and BatchNorm refers to applying Batch Normalization (Ref. [5]) to increase training speed.

Figure 3:
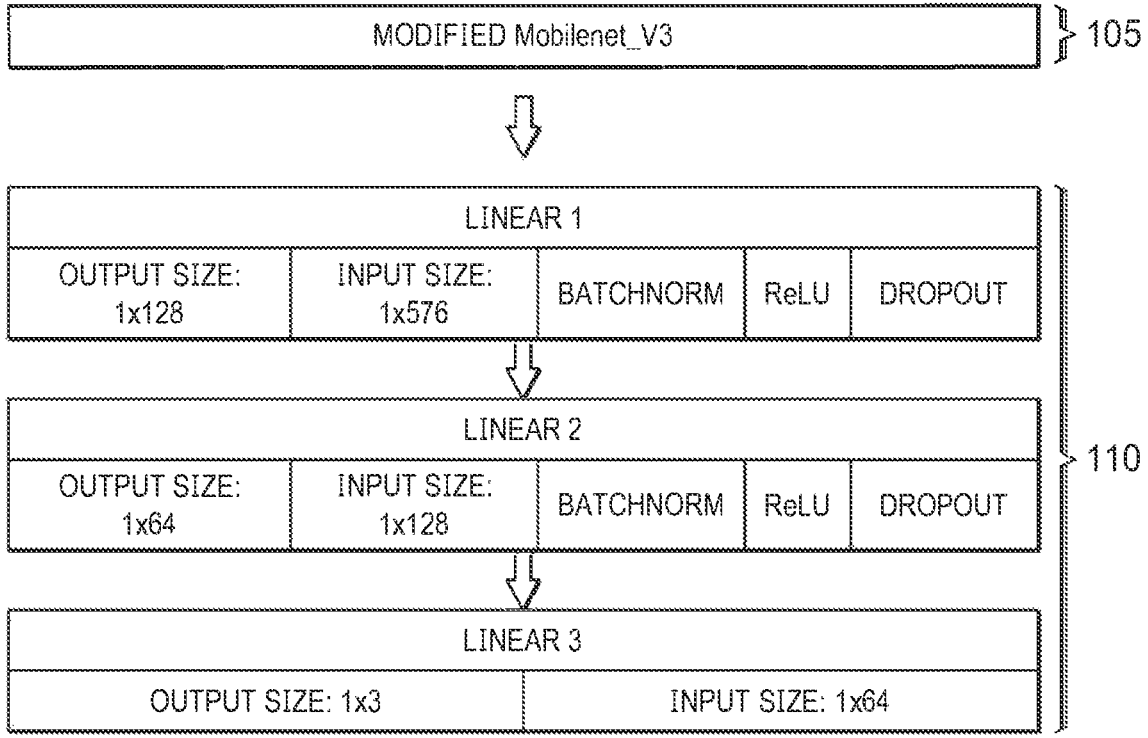
FIG. 3 depicts a second example of a neural-network architecture for generating trim-pass metadata according to another example embodiment of the present invention.

FIG. 3 depicts an example of the second architecture. As depicted in FIG. 3, in the second architecture, the feature extraction network (105) comprises a modified version of the MobileNet_V3 network, originally described in Ref. [4] for images with 1:1 aspect ratios, but now extended to operate on images of arbitrary aspect ratios. Table 1 (based on Table 2 in Ref. [4]) provides additional details for the operations in the modified MobileNetV3 architecture for an example 540×960×3 input. Compared to Ref. [4], after the second conv2d, 1×1, stage, the original pool, 7×7 stage is replaced by an average pool, 1×1 stage to generate the final output (e.g., 1×576), and the two subsequent conv2d, 1×1, non-batch normalization (NBN) stages are removed.

In Table 1, "bneck" denotes bottleneck and inverted residual blocks, Exp size denotes expansion block size, SE denotes if squeeze and excite is enabled, NL denotes the non-linear activation function, HS denotes the hard-swish activation function, RE denotes the ReLU activation function, and s denotes the stride. The output of a neural network stage matches the input of the subsequent neural network stage.

TABLE 1

| Specification for MobileNetV3 (Small) | | | | | |
|---|---|---|---|---|---|
| Input | Operator | Exp size | SE | NL | s |
| 540 × 960 × 3 | conv 2d, 3 × 3 | — | — | HS | 2 |
| 270 × 480 × 16 | bneck, 3 × 3 | 16 | Yes | RE | 2 |
| 135 × 240 × 16 | bneck, 3 × 3 | 72 | — | RE | 2 |
| 68 × 120 × 24 | bneck, 3 × 3 | 88 | — | RE | 1 |
| 68 × 120 × 24 | bneck, 5 × 5 | 96 | Yes | HS | 2 |
| 34 × 60 × 40 | bneck, 5 × 5 | 240 | Yes | HS | 1 |
| 34 × 60 × 40 | bneck, 5 × 5 | 240 | Yes | HS | 1 |
| 34 × 60 × 40 | bneck, 5 × 5 | 120 | Yes | HS | 1 |
| 34 × 60 × 48 | bneck, 5 × 5 | 144 | Yes | HS | 1 |

TABLE 1-continued

Specification for MobileNetV3 (Small)

| Input | Operator | Exp size | SE | NL | s |
|---|---|---|---|---|---|
| 34 × 60 × 48 | bneck, 5 × 5 | 288 | Yes | HS | 2 |
| 17 × 30 × 96 | bneck, 5 × 5 | 576 | Yes | HS | 1 |
| 17 × 30 × 96 | bneck, 5 × 5 | 576 | Yes | HS | 1 |
| 17 × 30 × 96 | conv2d, 1 × 1 | — | Yes | HS | 1 |
| 17 × 30 × 576 | average pool, 1 × 1 | — | — | — | 1 |

Output 1 × 1 × 576 to the Fully Connected Network

Following network 105, the fully connected network (110) includes three linear networks configured as follows:

Linear1: Input: 1×576, Output: 1×128, Batch Norm, ReLU, DropOut

Linear2: Input: 1×128, Output: 1×64, Batch Norm, ReLU, DropOut

Linear 3: Input: 1×64, Output: 1×3

As described in Ref. [4], MobileNetV3 is tuned to mobile phone CPUs for object detection and semantic segmentation (or dense pixel prediction). It uses a variety of innovative tools, including:

Depth-wise convolutional filters

Bottleneck and inverted residual blocks (bneck).

Squeeze and excite (SE) blocks (Ref. [6]); and the

Hard-Swish (HS) activation function, defined as $$\text{hard\_swish}[x] = x \frac{ReLU6(x+3)}{6}, \tag{2}$$

where ReLU6 denotes a known in the art activation function.

Fully Connected Network

The output of the Feature Extraction Module (105) is fed to the fully connected network to get the predicted trim values. Based on the architecture of the feature extraction module, the fully connected network could have a different input size and thus might need a different output size. This module learns the mapping between the high-level features extracted from the image to its associated Slope, Offset, and Power. As mentioned above, the same network design can be used to directly compute Lift, Gain and Gamma, or any other parameters related to trim pass metadata.

In terms of complexity, the first architecture is simpler and less computationally intensive than the MobileNet-based architecture; however, the MobileNet-based architecture is more accurate.

The second architecture can take directly three input channels (say, RGB or ICtCp); however, it would be straightforward to modify the first architecture to take into consideration chroma as well by allowing three input channels instead of just one.

Network Training

As depicted in FIG. 1B, in training, during the error computation (120), one may apply either an L1 loss (e.g., MAE) or an L2 loss (e.g., MSE). This loss is calculated between the predicted trim pass metadata values (112) and the ground truth trim pass metadata values (132). Alternatively, one may also use the tone curve as a loss function. Essentially, one can use the trim pass metadata values along with other metadata values (such as L1) and define a tone curve corresponding to that image. Then one can minimize either the L1 loss or L2 loss between the tone curves that are obtained using the predicted trim pass metadata and the ground truth trim pass metadata.

For example, let $f_{true}(i)$ denote a tone curve generated using L1 metadata for the input (102) and training trim-pass metadata (132), and let $f_{pred}(i)$ denote a tone curve generated using the same L1 metadata and predicted trim-pass metadata (112). Then, during training, one may want to minimize the mean-square error defined as:

$$\text{Loss} = \frac{1}{|i|}\sum_i (f_{true}(i) - f_{pred}(i))^2, \tag{3}$$

where |i| denotes the cardinality of the i-values for which the MSE is computed. Alternatively, one may apply an L1 metric, as in $$\text{Loss} = \frac{1}{|i|}\sum_i |f_{true}(i) - f_{pred}(i)|^{\square}. \tag{4}$$

REFERENCES

Each of these references is include by reference in its entirety.

1. A. Ballestad and A. Kostin, U.S. Pat. No. 8,593,480, "Method and apparatus for image data transformation"

2. J. A. Pytlarz and R. Atkins, U.S. Pat. No. 10,600,166, "Tone curve mapping for high dynamic range images."

3. "Module 2.8—*The Dolby Vision metadata Trim Pass*," https://learning.dolby.com/hc/en-us/articles/360056574431-Module-2-8-The-Dolby-Vision-Metadata-Trim-Pass-, downloaded May 3, 2022.

4. A. Howard, et al., "*Searching for MobileNetV3*," Proceedings of the IEEE/CVF International Conference on Computer Vision. 2019, also arXiv: 1905.02244v 5, 20 Nov. 2019.

5. S. Ioffe, and C. Szegedy. "*Batch normalization: Accelerating deep network training by reducing internal covariate shift.*" International conference on machine learning. PMLR, 2015, also arXiv: 1502.03167v3, 2 Mar. 2015.

6. J. Hu, et al, "*Squeeze-and-excitation networks*," arXiv: 1709.01507v4, 16 May 2019.

EXAMPLE COMPUTER SYSTEM IMPLEMENTATION

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to image transformations, such as those described herein. The computer and/or IC may compute any of a variety of parameters or values that relate to trim-pass metadata prediction processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to trim-pass metadata prediction processes as described above by executing software instructions in a program memory accessible to the processors. The invention may also be provided in the form of a program product. The program product may comprise any tangible and non-transitory medium which carries a set of computer-readable signals comprising instructions which, when executed by a data processor, cause the data processor to execute a method of the invention. Program products according to the invention may be in any of a wide variety of tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to trim-pass metadata prediction processes are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for generating trim-pass metadata of pictures in a video sequence, wherein the trim-pass metadata are configured to perform adjustments of a tone-mapping curve that is applied to an input picture when being displayed on a target display, the method comprising:

receiving the input picture;

providing a feature extraction network, the feature extraction network comprising a convolutional neural network for feature extraction that is trained to identify high-level image features of the input picture;

applying the feature extraction network to the input picture to generate the image features;

providing a fully connected network, the fully connected network comprising a plurality of cascaded linear neural networks that are trained to map the image features to output trim-pass metadata values for the input picture; and applying the fully connected network to the image features to map the image features to the output trim-pass metadata values for the input picture, wherein training the networks comprises:

receiving input training trim-pass parameters corresponding to the input picture;

applying an error loss unit to generate an error metric based on the input training trim-pass parameters and the output trim-pass metadata; and training the feature extraction network and the fully connected network by minimizing the error metric.

2. The method of claim 1, wherein the input picture is a high-dynamic range (HDR) picture coded using PQ encoding in the ICtCp color space.

3. The method of claim 1, wherein the feature extraction network comprises four cascaded convolutional networks.

4. The method of claim 3, wherein the fully connected network comprises three cascaded linear networks.

5. The method of claim 1, wherein the feature extraction network comprises a modified MobileNetV3 neural network accepting inputs with non square aspect ratios.

6. The method of claim 5, wherein the fully connected network comprises three cascaded linear networks.

7. The method of claim 1, wherein computing the error metric comprises computing a minimum absolute error or a mean square error between the input training trim-pass parameters and the output trim-pass metadata.

8. The method of claim 1, wherein computing the error metric comprises:

generating a first tone-mapping function based at least on the input training trim-pass parameters;

generating a second tone-mapping function based at least on the output trim-pass metadata; and computing the minimum absolute error or the mean square error between values of the first tone-mapping function and the second tone-mapping function.

9. An apparatus comprising a processor and configured to perform the method recited in claim 1.

10. A non-transitory computer-readable storage medium having stored thereon computer-executable instruction for executing a method with one or more processors in accordance with claim 1.

* * * * *